Nov. 21, 1961     R. E. PRICE     3,009,455
PROFILE DRESSER
Filed Nov. 20, 1958     2 Sheets-Sheet 1
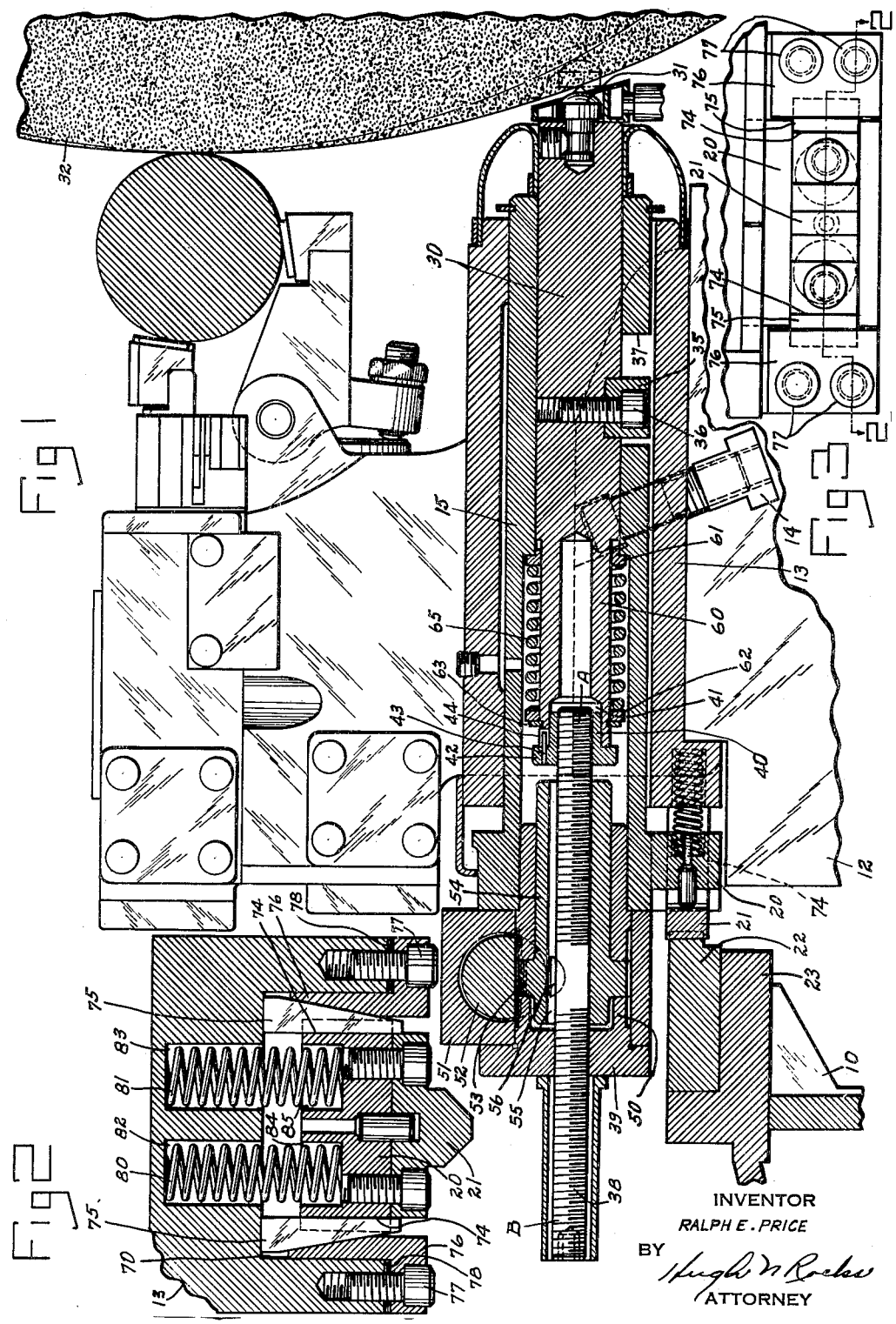
INVENTOR
RALPH E. PRICE
BY
*Hugh M Rocker*
ATTORNEY

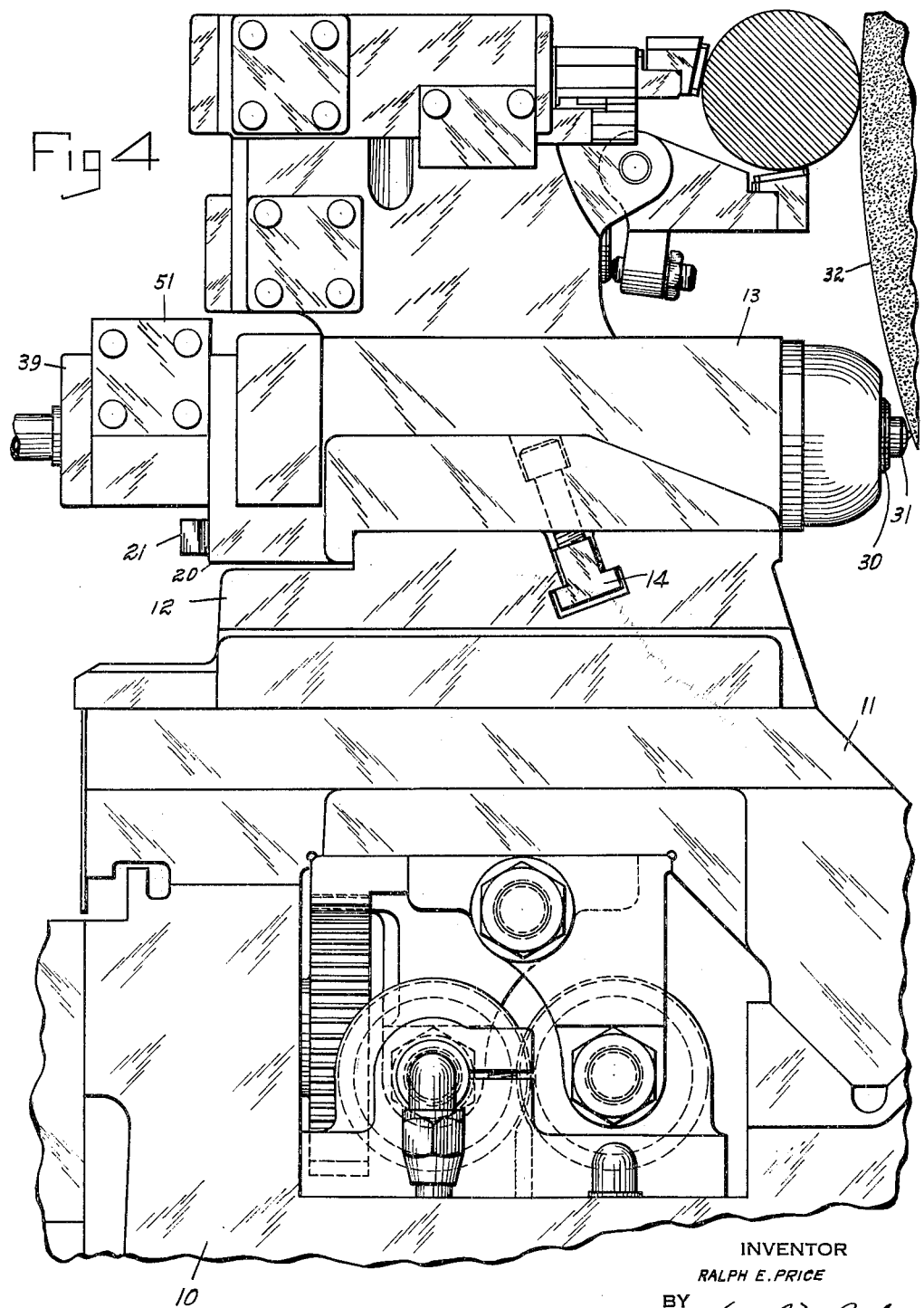

3,009,455
PROFILE DRESSER
Ralph E. Price, Waynesboro, Pa., assignor to Landis Tool Company, Waynesboro, Pa.
Filed Nov. 20, 1958, Ser. No. 775,230
5 Claims. (Cl. 125—11)

This invention relates to dressing devices for grinding wheels, particularly for grinding wheels having a formed or a non-cylindrical peripheral surface.

The means generally used for dressing a form on a grinding wheel consists of a follower on the movable portion of the dressing tool and a stationary profile bar having a surface corresponding to the surface to be formed on the grinding wheel.

The follower is held in engagement with the profile bar by means of a spring acting on the dressing tool. In some cases, the arrangement of stationary and movable parts may be reversed. For the purpose of illustration, the movable dressing tool will be considered.

When such a tool is traversed across the grinding wheel, the follower travels across the profile bar and causes the tool to move toward and away from the grinding wheel in accordance with the form to be dressed on the wheel. As the follower moves along the profile bar, it is subjected to forces other than that required to move the dressing tool toward and from the grinding wheel. These forces are transmitted through the follower to the dressing tool generally in the form of a slight rotation of the tool holder and, therefore, of the dressing tool itself.

Any such movement of a diamond during a dressing operation, changes the relation between the diamond and the grinding wheel so that it may dress a form sufficiently different from the form on the profile bar as to make the workpieces ground by the wheel unacceptable.

It is, therefore, an object of this invention to provide a means for transmitting the form of a profile bar to a dressing tool to a grinding wheel while, at the same time, preventing the transmission to said dressing tool of other forces acting on the follower.

FIGURE 1 is a right hand end view of the combined dresser and steady rest with the dresser shown in section.

FIGURE 2 is a partial sectional plan view of the follower mounting.

FIGURE 3 is a partial front elevation showing the follower mounting.

FIGURE 4 is a partial end elevation showing the relation of the dresser tool to the bed and the carriage of the machine.

Numeral 10 indicates the bed of a grinding machine, 11 is the carriage and 12 is the swivel table. 13 is a dresser housing attached to table 12 by means of T-bolts 14. Inside housing 13, there is slidably mounted a sleeve 15. Sleeve 15 has a radially extending portion 20, the function of which will be described later.

Tool holder 30 is slidably mounted for limited endwise movement in sleeve 15. Dressing tool 31 is secured in the right hand end of tool holder 30. A stop member 35 is partially inserted in tool holder 30 and held in place by screw 36. Member 35 extends radially into an elongated slot 37 in sleeve 15. Slot 37 determines the extent of adjustment of tool holder 30 in sleeve 15.

The means for effecting axial adjustment of dressing tool 31 toward and from grinding wheel 32, comprises a differential adjusting screw 38 having a flanged member 40 threaded on the right hand end of threaded portion A and extending into bore 41 in the left end of tool holder 30. A pin 42 in the flanged portion 43 extends axially to the right to engage slot 44 in the end of tool holder 30. The purpose of pin 42 and slot 44 is to prevent rotation of flanged member 40 with screw 38. The other end of screw 38 has a thread B of different pitch which co-acts with a threaded bore in cap member 39. Member 39 has a reduced portion 50 extending into housing 51 in which is slidably mounted a piston 52 to which is attached a pawl (not shown) for engaging the teeth of ratchet 53. Ratchet 53 is formed on a sleeve member 54. An elongated key way 55 in sleeve member 54 co-acts with key 56 in screw 38.

Sleeve 15 is bored to two diameters, the smaller diameter to the right and the larger diameter to the left. The left end of tool holder 30 has a reduced portion 60. Washer 61 on reduced portion 60 of tool holder 30 extends radially into the larger diameter bore of sleeve 15. Spring 65 bears at the right hand end against washer 61 and the left hand end against washer 62 held in predetermined position on reduced portion 60 of tool holder 30 by snap ring 63. Spring 65 urges tool holder 30 to the left and through flanged member 40 to compensate for backlash between member 40 and the threads on portion A of screw 38. Spring 65, acting through member 40 and screw 38, also serves to take up backlash between thread portions B of screw 38 of member 39 into which it is threaded.

The radially or laterally extending portion 20 of sleeve 15 has attached thereto a follower member 21. Member 21 is adapted to engage profile bar 22 supported on bracket 23 on bed 10 of the grinding machine. Portion 20 is slidably supported in a longitudinal guideway 70 in housing 13. The sides of portion 20 each have a wide longitudinal extending slot 74 into each of which is inserted a key 75. Key 75 has non-parallel sides and is urged into close engagement with portion 20 by means of wedge members 76 having inclined surfaces adapted to engage similar surfaces on key 75. Members 76 are adjusted against keys 75 by means of screws 77 and shims 78. The keys 75 and wedges 76 combine to form quoins which constitute slide bearings or guide means preventing lateral play of the follower in the guideway. Thus the forces resulting from the movement of the follower member 21 along the profile bar 22 are absorbed by the slide bearings in housing 13 in which tool holder 30 and sleeve 15 are slidably mounted instead of being transmitted through sleeve 15 to the tool holder 30.

Follower member 21 is held in engagement with profile bar 22 by means of a pair of parallel springs 80 and 81 supported in holes 82 and 83 in housing 13. Springs 80 and 81 extend into similar holes 84 and 85 in portion 20.

I claim:

1. Mounting means for a grinding wheel dressing tool, comprising a housing movable axially of the grinding wheel and having a longitudinal guide way, a sleeve slidably mounted in said housing, a tool holder adjustably mounted in said sleeve, said sleeve having a lateral extension in the guideway of the housing, a profile bar and a follower carried by the said lateral extension for guiding said dressing tool to dress a grinding wheel and guide means supported independently of said sleeve and engaging the sides of said follower for holding said follower against dislocation by forces resulting from the relative movement between said follower and said profile bar.

2. Mounting means for a grinding wheel dressing tool, comprising a housing movable axially of the grinding wheel and having a longitudinal guideway, a sleeve slidably mounted in said housing, a tool holder adjustably mounted in said sleeve, said sleeve having a lateral extension in the guideway of the housing, a stationary profile bar, a follower carried by the said lateral extension, for sliding engagement with said profile bar, resilient means between said follower and said housing for maintaining contact between said profile bar and said follower, and guide means for holding said follower against lateral movement whereby to prevent transmission of forces to said dressing tool resulting from the relative movement between said follower and said profile bar.

3. Mounting means for a grinding wheel dressing tool, comprising a housing movable axially of the grinding wheel and having a longitudinal guideway, a sleeve slidably mounted in said housing, a tool holder adjustably mounted in said sleeve, said sleeve having a lateral extension in the guideway of the housing, a profile bar, a follower carried by the said lateral extension, resilient means holding said follower in contact with said profile bar, means between the follower and the guideway for preventing the lateral play of the follower in said guideway.

4. Mounting means for a grinding wheel dressing tool, comprising a housing movable axially of the grinding wheel and having a longitudinal guideway, a sleeve slidably mounted on said housing, a tool holder adjustably mounted in said sleeve, said sleeve having a lateral extension in the guideway of the housing, a follower carried by the said lateral extension, expansion springs between the follower and the base of said extension, and wedges between the follower and the sides of said extension.

5. Mounting means for a grinding wheel dressing tool comprising a housing movable axially of the grinding wheel, a sleeve slidably mounted in said housing, a tool holder adjustably mounted in said sleeve, said sleeve having a depending portion, a profile bar, a follower carried by said depending portion, a spring for holding said follower against said profile bar, and means for holding said depending portion against movement by deflecting forces resulting from the relative movement between said follower and said profile bar.

References Cited in the file of this patent

UNITED STATES PATENTS

| | | |
|---|---|---|
| 1,031,726 | Mills | July 9, 1912 |
| 1,195,293 | Townsend | Aug. 22, 1916 |
| 2,439,268 | Shafer | Apr. 6, 1948 |
| 2,447,478 | Rundt | Aug. 17, 1948 |
| 2,451,395 | Klukan | Oct. 12, 1948 |
| 2,565,687 | Hoier | Aug. 28, 1951 |